March 1, 1966
H. RASKI
3,237,873
METHOD AND APPARATUS FOR DISASSOCIATING
AGGLOMERATED ROCK SALT
Filed Nov. 26, 1963
2 Sheets-Sheet 1
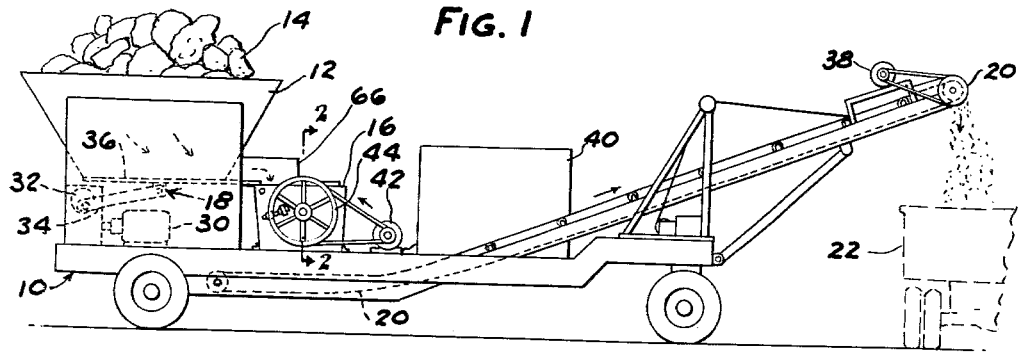
FIG. 1
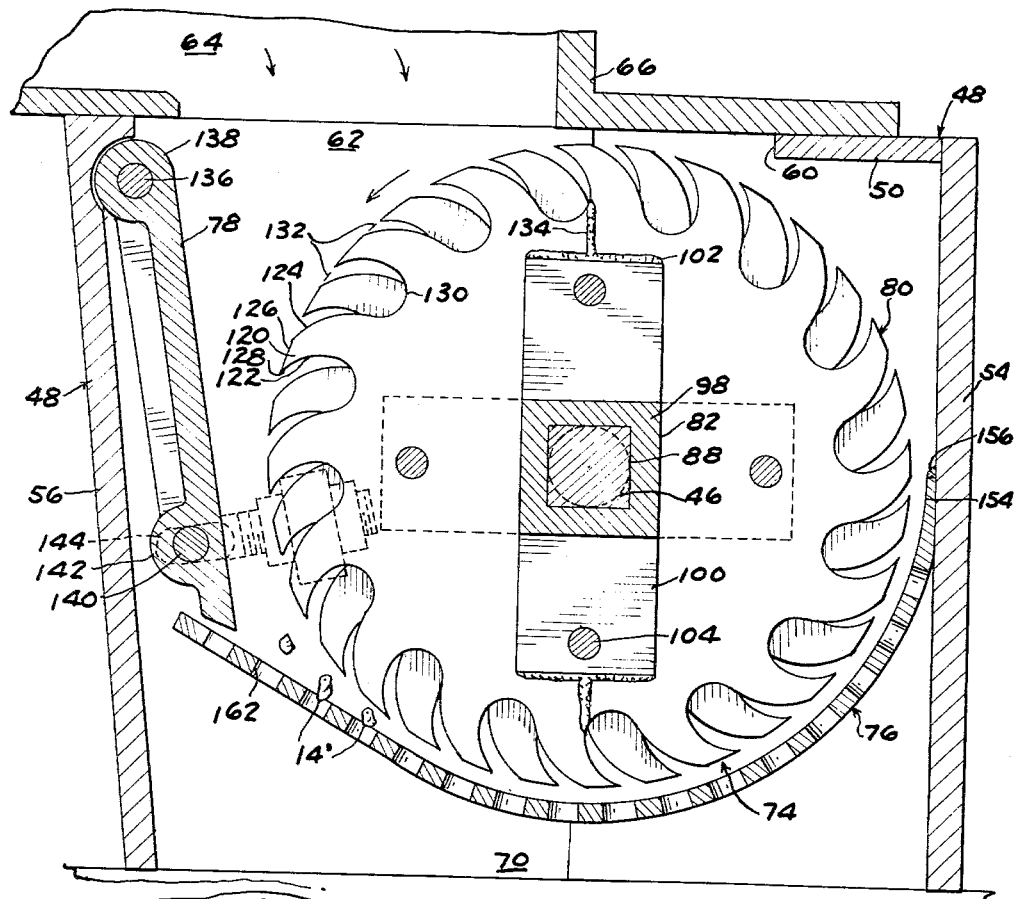
FIG. 3
FIG. 4
INVENTOR.
HEIMO RASKI
BY
Barnes, Kisselle, Raisch
& Choate
ATTORNEYS March 1, 1966

H. RASKI 3,237,873

METHOD AND APPARATUS FOR DISASSOCIATING
AGGLOMERATED ROCK SALT

Filed Nov. 26, 1963

INVENTOR.
HEIMO RASKI

BY
Barnes, Kisselle, Raisch
& Choate
ATTORNEYS

United States Patent Office 3,237,873
Patented Mar. 1, 1966

3,237,873
**METHOD AND APPARATUS FOR DISASSOCIAT-
ING AGGLOMERATED ROCK SALT**
Heimo Raski, 819 Lloyd, Royal Oak, Mich.
Filed Nov. 26, 1963, Ser. No. 325,844
11 Claims. (Cl. 241—27)

This invention relates to milling and in particular to a method and an apparatus for restoring previously crushed agglomerated rock salt to its original crushed size.

Rock salt is often crushed in large quantities and then stored outside, exposed to the elements, until it is used, as for example to prevent accumulation of ice on roads. When stored under certain weather conditions, primarily winter cold and dampness, crushed rock salt will agglomerate into relatively solid lumps or masses, particularly at exposed surfaces of a storage pile. Agglomerated rock salt must be restored to its original crushed size before it can be used effectively in conventional spreaders constructed to handle salt crushed to a specific size. One way of disassociating the agglomerated salt is to rely solely on impact when the salt is dumped into a truck. Alternatively, the agglomerated salt can be thrown against the side of a hopper when the truck is loaded. Such methods are extremely ineffective and inefficient and, over a winter season, substantial quantities of agglomerated salt cannot be used and are wasted.

This invention contemplates disassociating agglomerated rock salt with a milling method and a milling apparatus which are simple, effective, economical, and efficient.

In the drawings:

FIG. 1 shows a wheeled vehicle provided with the mill of this invention to process previously crushed agglomerated rock salt just prior to use.

FIG. 3 is a view taken along line 3—3 of FIG. 2 to illustrate the mill and the configuration of the milling blades.

FIG. 4 is an enlarged view illustrating an adjustable connection used with a crusher plate in the mill illustrated in FIGS. 1–3.

Figure 2:
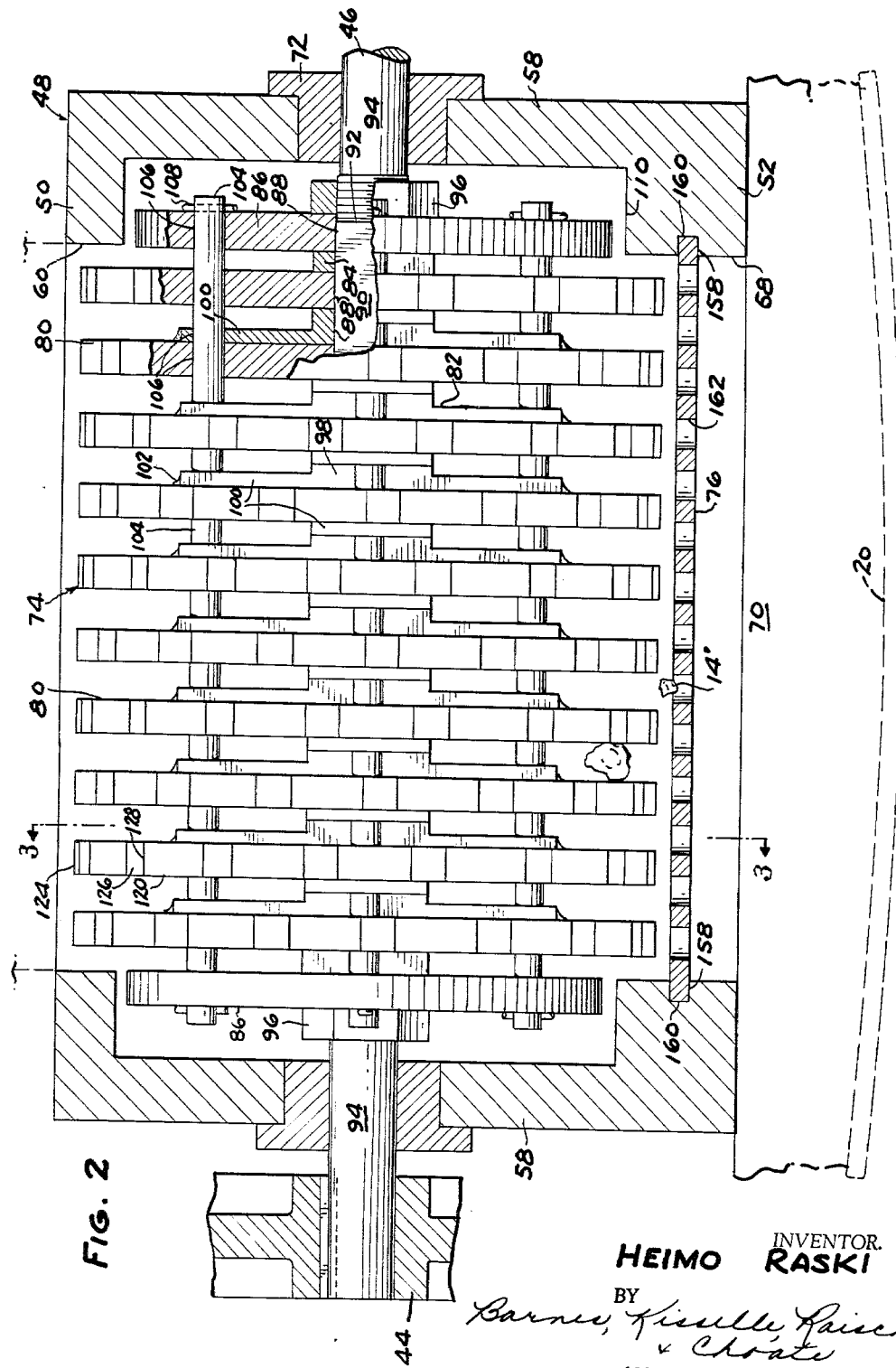
FIG. 2 is a view, partially in section, taken along line 2—2 of FIG. 1 to illustrate milling blades and other internal features of the mill.

For purposes of illustration and not by way of limitation, the milling apparatus comprises a wheeled trailer 10 having a hopper 12 rigidly mounted at one end for receiving previously crushed, rock salt 14 from a loader (not shown). Salt 14 may be partially agglomerated as evidenced by large, relatively solid lumps. Salt 14 is transferred from hopper 12 to a mill 16 by a vibratory feeder 18 and, after processing by mill 16, is transferred by endless belt conveyor 20 to a truck 22 provided with a spreader (not shown) for distributing salt 14 on icy roads.

Feeder 18 comprises a motor 30 which rotates a wheel 32 having an eccentrically mounted link 34 connected to a shaker table 36 that forms the bottom of hopper 12. When table 36 shakes, salt 14 moves from left to right, as viewed in FIGS. 1 and 3, into mill 16. Conveyor 20 is conventional and may be driven by a separate motor 38.

A conventional motor-generator unit 40 on trailer 10 powers a motor 42 which, in turn, drives a drive pulley 44 of the mill 16. Pulley 44 is keyed to one end of a horizontal shaft 46 which extends through and is journalled in a mill housing 48. Housing 48 has a top wall 50, a bottom wall 52, a pair of side walls 54, 56, and a pair of end walls 58. Wall 50 is apertured at 60 to form an inlet 62 into which salt 14 is fed by feeder 18 through a passageway 64 formed in housing 66. Wall 52 is open at 68 to form an outlet 70, opening directly above conveyor 20. Shaft 46 is journalled in end walls 58 by bearings 72 and has a rotor indicated generally by numeral 74 nonrotatably mounted thereon. Preferably end walls 58 are split and bolted together to facilitate assembly and removal of the rotor 74 as a unit. Below rotor 74 is a rigid steel screen 76, a substantial portion of which is spaced concentrically from the peripheral surface of rotor 74. Screen 76 extends from one side wall 54 around the lower side of rotor 74 and has its free edge underlying the lower end of a vertically inclined milling plate 78, which is swingable in housing 48 and adjustable relative to rotor 74.

Rotor 74 generally comprises a plurality of disc-shaped blades 80, preferably made of steel, displaced longitudinally along shaft 46 by spacers 82, a pair of end spacers 84, and a pair of end plates 86, all of which have square central apertures 88 which nonrotatably lock with a square central portion 90 of shaft 46. The square cross section of portion 90 changes abruptly at shoulder 92 to a circular cross section to form a pair of terminal portions 94 on shaft 46. A pair of nuts 96, threaded on terminal portions 94 adjacent shoulder 92, clamp blades 80, spacers 82, 84, and end plates 86 on shaft 46. Each spacer 82 has a square central boss 98 and four radial arms 100 spaced ninety degrees apart, with each pair of alternate arms abutting respective adjacent blades 80. Arms 100 are secured to blades 80 as by welding along the radially outer ends of the arms as indicated generally at 102 to reinforce blades 80. Bosses 98 space blades 80 along shaft 46. A plurality of rods 104 extend axially of shaft 46 and pass through suitable apertures 106 in blades 80, arms 100, and end plates 86 to further interconnect the parts. Each rod 104 has a key 108 at each end, abutting end plates 86 to retain rods 104 in place. Each end plate 86 is disposed in and substantially closes the mouth of a circular recess 110 in each end wall 58.

Each blade 80 has a plurality of radially projecting teeth 120 equally spaced peripherally and curved radially outwardly and forwardly in the direction of rotation (counterclockwise as viewed in FIG. 3). Each tooth 120 has a concave forward face 122 and a convex trailing face 124 interconnected by an intermediate relatively flat face 126 which forms a sharp edge 128 at the juncture with face 122. Faces 122, 124 of adjacent teeth 120 are joined by an arcuate root 130. Faces 126 lie substantially on a circle shown in broken lines and indicated generally by numeral 132 in FIG. 3. Each blade 80 may be constructed in two symmetrical half sections assembled together on square portion 90 by welding as at 134. In the rotor illustrated in the drawing, alternate blades 80 are angularly offset on shaft 46 approximately one-half the pitch of the teeth to stagger the teeth on the peripheral surface of rotor 74. However, blades 80 may be offset in numerous ways to distribute the teeth over the surface of rotor 74.

Plate 78, also made of steel, is fashioned with a boss 138 along its upper edge by means of which it is swingably mounted in housing 48 by a shaft 136. Plate 78 is substantially coextensive in length with rotor 74 and is inclined downwardly from its pivot axis defined by shaft 136 and inwardly toward the periphery of rotor 74. A shaft 140 mounted in a boss 142 along the lower edge of plate 78 extends through elongated slots 144 in end walls 58 (FIGS. 3 and 4). The outer ends of shaft 140 are journalled in a bushing 146 having an integral threaded extension 148 adjustably clamped on a boss 150 on each end plate 86 by a pair of nuts 152. Shaft 140 is retained in bushing 146 by nuts 153. Plate 78 may be adjusted relative to rotor 74 by loosening nuts 152 and swinging plate 78 about shaft 136. The position of plate 78 and the speed of rotor 74 are adjusted to obtain optimum output from mill 16 and plate 78 is then locked in position.

Screen 76 has one edge 154 (right edge as viewed in FIG. 3) secured to side wall 54 as by welding indicated generally at 156 and curves downwardly in spaced concentric relation to the outer periphery of rotor 74 and then curves upwardly to underlie the lower edge of plate 78. Screen 76 extends substantially the entire axial length of rotor 74 and has its terminal portions 158 rigidly mounted in arcuate slots 160 in bottom and end walls 52, 58, respectively, so that screen 76 completely separates rotor 74 from outlet 70. Screen 76 is perforated by numerous circular cross section openings 162 so that only certain sized particles processed by rotor 74 pass freely to outlet 70. Generally, openings 162 are substantially larger than the size to which the salt was previously crushed, but preferably less than twice the original size, to increase the output of mill 16.

Operation of the mill of the instant invention is initiated by energizing motors 30, 38, and 42 to actuate feeder 18 and conveyor 20, and also rotate rotor 74 counterclockwise as viewed in FIG. 3. Salt 14 which has been previously crushed and may be partially agglomerated is loaded into hopper 12 by any suitable means and fed by vibratory feeder 18 into inlet 62 of mill 16. The agglomerated salt then drops against blades 80 of rotor 74 and undergoes an initial breakup caused by impact with sharp edges 128 and flat faces 126. The salt 14 then moves downward, due to gravity and the motion of rotor 74, between plate 78 and rotor 74, where it is subjected to crushing forces to further disassociate the agglomerated lumps. The salt continues downward from plate 78 and undergoes still further disassociation as it is crushed between screen 76 and rotor 74. Salt particles designated by 14' in FIGS. 2 and 3 which have been reduced to a size sufficient to pass through openings 162 in screen 76, drop downward through screen 76 onto conveyor 20 which transfers the salt to truck 22.

By way of example, where the spreader on truck 22 is designed to handle salt initially crushed to a size having a maximum dimension of three-fourths of an inch, satisfactory results have been achieved where the space between plate 78 and rotor 74 was approximately two inches, screen 76 and openings of approximately one and one-fourth inches in diameter, and the radial space between rotor 74 and screen 76 was in the order of three-fourths to one inch. Rotor 74 had ten blades, spaced one and three-fourths inches apart. Each blade 80 was twenty-five inches in diameter, one and one-half inches thick with root portions 130 lying on a two-inch circle whose center is on a twenty-one inch diameter circle. Up to 200 tons per hour have been processed by the mill disclosed when rotor 74 was rotated at 230 r.p.m. However, for the example given, rotor speeds substantially higher than 230 r.p.m., as for example speeds in the order of 1000 r.p.m. that are common in hammer mills of the type having radial lugs, crush or pulverize the salt, while speeds substantially under 230 r.p.m. decrease substantially the quantity of salt processed by the mill.

It is to be understood that the purpose of the mill is not to crush or re-crush the individual, previously crushed salt particles, but merely to disassociate the agglomerated particles. Because the mill merely disassociates the agglomerated particles, as contrasted to crushing in the conventional sense, the spacing between rotor 74 and screen 76, and in particular, the spacing between plate 78 and rotor 74, and the size of openings 162 can be substantially greater than the size to which the salt was originally crushed, preferably less than twice the original crushed size, to substantially increase production of mill 16. The position of plate 78 relative to rotor 74 depends primarily on the size and hardness of the agglomerated lumps. Any large lumps of agglomerated salt will not pass between rotor 74 and plate 78 and will, therefore, be subjected to repeated impact by rotor 74 and chipping by edges 128 of teeth 120. The forward curvature of teeth 120 in effect grabs larger agglomerated lumps and feeds them against plate 78. Because the axial spacing of blades 80 is greater than the size to which the salt was originally crushed, particles of salt which are not agglomerated pass freely through the rotor to the screen to further increase production of the mill. Lumps in the order of two to three times the size of the salt as originally crushed may fall in the axial space between blades 80, but they will eventually be disassociated after rotor 74 completes several complete revolutions. For the example given above, it is estimated that approximately sixty percent (60%) of the salt entering inlet 62 is disassociated by the time it has cleared plate 78, thirty percent (30%) is disassociated between rotor 74 and screen 76, and approximately ten percent (10%) is carried around or returned by the rotor 74 for re-processing.

Although the mill described hereinabove is particularly useful in disassociating previously crushed agglomerated rock salt, a mill having a rotor substantially similar to the rotor described hereinabove has been used to crush shale of the type sometimes referred to as Bell shale.

I claim:

1. In the method of restoring previously crushed rock salt to its original crushed size having a predetermined maximum dimension after said crushed rock salt has been exposed to weather conditions under which some of said crushed rock salt agglomerates into relatively hard agglomerations, the steps of impacting said agglomerated rock salt with a revolving rotor to initially disassociate said agglomerated rock salt, further disassociating said agglomerated rock salt by passing said rock salt between said rotor and a plate spaced from the periphery of said rotor a distance in the order of twice said predetermined dimension, and still further disassociating said agglomerated salt by passing said salt between the periphery of said rotor and an apertured screen spaced radially from said rotor in the order of said predetermined dimension, said apertures being dimensioned in the order of twice said predetermined dimension.

2. The method set forth in claim 1 wherein said agglomerated rock salt is impacted by relatively sharp edges of teeth on said rotor, crushed between relatively flat faces of said teeth and a plate in juxtaposition with the periphery of said rotor, and then further crushed between said flat faces and said screen.

3. The method set forth in claim 2 wherein said rotor has a peripheral speed in the order of fifteen hundred feet per minute.

4. A mill for use with rock salt which has been crushed to a predetermined maximum dimension in the order of three-fourths of an inch and then stored while exposed to weather conditions under which some of said crushed salt agglomerates into relatively hard agglomerations comprising a housing having generally vertical opposed side and end walls, a generally horizontal shaft extending in a direction between said end walls and journaled in said housing for rotation about a substantially horizontal axis, said housing having an inlet above said axis and an outlet below said axis, a plurality of toothed disc-shaped blades axially spaced and nonrotatably mounted on said shaft, a generally flat plate mounted on said housing between said blades and one of said side walls, said plate extending axially of said shaft and being spaced from the periphery of said blades to form a restricted opening therebetween, said plate being spaced from the periphery of said blades at said restricted opening a distance in the order of one and one-fourth inches, an apertured screen mounted in said housing between said blades and said outlet, said screen extending axially of said shaft between said end walls and peripherally of said blades from the other of said side walls in a direction toward said one side wall to underlie said blades, said apertures in said screen being dimensioned in the order of one and one-fourth inches, a substantial portion of said screen being spaced concentrically from said rotor a distance in the order of three-fourths of an inch, and said blades being operatively rotatable in a direction from said inlet.

5. A mill for use with rock salt which has been crushed to a predetermined maximum dimension and then stored while exposed to weather conditions under which some of said crushed salt agglomerates into relatively hard agglomerations comprising a housing having generally vertical opposed side and end walls, a generally horizontal shaft extending in a direction between said end walls and journaled in said housing for rotation about a substantially horizontal axis, said housing having an inlet above said axis and an outlet below said axis, a plurality of toothed disc-shaped blades axially spaced and non-rotatably mounted on said shaft, a plate mounted on said housing between said blades and one of said side walls, said plate extending axially of said shaft and being spaced from the periphery of said blades to form a restricted opening therebetween, an apertured screen mounted in said housing between said blades and said outlet, said screen extending axially of said shaft between said end walls and peripherally of said blades from the other of said side walls in a direction toward said one side wall to underlie said blades, said blades being operatively rotatable in a direction from said inlet, past said plate and toward said outlet, said restricted opening, said apertures, the space between said screen and said blades, and the axial spacing between said blades being at least as great as said predetermined maximum dimension.

6. A mill for use with rock salt which has been crushed to a predetermined maximum dimension and then stored while exposed to weather conditions under which some of said crushed salt agglomerates into relatively hard agglomerations comprising a housing having an inlet and an outlet, a rotor mounted in said housing in spaced relation thereto and having a plurality of rigid blades formed with a discontinuous periphery, said blades being substantially perpendicular to a rotational axis of said rotor, means forming a fixed milling surface in said housing in juxtaposition to and extending longitudinally of said rotor to form a restricted opening therebetween, said rotor being rotatable in a direction from said inlet past said fixed milling surface and toward said outlet, an apertured screen mounted in said housing between said rotor and said outlet, said screen extending axially and peripherally of said rotor to separate said rotor from said outlet, said space between said rotor and said plate being in the order of twice said predetermined dimension, and the size of said apertures being in the order of twice said predetermined dimension.

7. A mill for use with rock salt which has been crushed to a predetermined maximum dimension and then stored while exposed to weather conditions under which some of said crushed salt agglomerates into relatively hard agglomerations comprising a housing having an inlet and an outlet, a rotor mounted in said housing in spaced relation thereto and having a plurality of rigid blades formed with a discontinuous periphery, said blades being substantially perpendicular to a rotational axis of said rotor, means forming a fixed milling surface in said housing in juxtaposition to and extending longitudinally of said rotor to form a restricted opening therebetween, said rotor being rotatable in a direction from said inlet past said fixed milling surface and toward said outlet, an apertured screen mounted in said housing between said rotor and said outlet, said screen extending axially and peripherally of said rotor to separate said rotor from said outlet, and said screen being spaced radially from the peripheral surface of said rotor a distance approximately equal to said predetermined dimension.

8. A mill for use with rock salt which has been crushed to a predetermined maximum dimension and then stored while exposed to weather conditions under which some of said crushed salt agglomerates into relatively hard agglomerations comprising a housing having an inlet and an outlet, a rotor mounted in said housing in spaced relation thereto and having a plurality of disc-shaped rigid toothed blades, said teeth being curved outwardly and forwardly of said rotor with adjacent teeth on each of said blades being spaced apart a distance in the order of twice said predetermined maximum dimension, said blades being substantially perpendicular to a rotational axis of said rotor, means forming a fixed milling surface in said housing in juxtaposition to and extending longitudinally of said rotor to form a restricted opening therebetween, said rotor being rotatable in a direction from said inlet past said fixed milling surface and toward said outlet, an apertured screen mounted in said housing between said rotor and said outlet, said screen extending axially and peripherally of said rotor to separate said rotor from said outlet, said milling surface being closest to said rotor at said restricted opening, the space between said milling surface and the peripheral surface of said rotor at said restricted opening being at least as great as said predetermined dimension, and said apertures in said screen being at least as great as said predetermined dimension.

9. In the method of restoring previously crushed rock salt to its original crushed size having a predetermined maximum dimension after said crushed rock salt has been exposed to weather conditions under which some of said crushed rock salt agglomerates into relatively hard agglomerations, the steps of impacting said agglomerations with a rotor operated at a speed that causes initial disassociation of said agglomerations without pulverizing said salt, and then further disassociating said agglomerations by passing said salt between said rotor and a plate spaced from the periphery of said rotor a distance greater than said predetermined dimension and in the order of twice said predetermined dimension while said rotor is rotating at said speed.

10. The method as set forth in claim 9 wherein said rotor has a peripheral speed in the order of 1500 feet per minute.

11. The method as set forth in claim 9 wherein said agglomerations are impacted by relatively sharp edges of disc-shaped toothed blades spaced axially along said rotor with the spacing between adjacent blades being greater than said predetermined dimension, and then said agglomerations are crushed between said plate and flat peripheral faces on said teeth.

References Cited by the Examiner

UNITED STATES PATENTS

| 357,317 | 2/1887 | Hascall | 241—73 X |
|---|---|---|---|
| 1,311,535 | 7/1919 | Shelton | 241—86 |
| 2,141,662 | 12/1938 | Ossing et al. | 241—242 X |
| 2,185,331 | 1/1940 | Conway | 241—189 X |
| 2,233,728 | 3/1941 | Bell. | |
| 2,268,860 | 1/1942 | Edens et al. | 241—86 |
| 2,287,799 | 6/1942 | Hartshorn | 241—189 X |
| 2,597,333 | 5/1952 | Jindrich | 241—86 X |
| 2,767,929 | 10/1956 | West | 241—189 |
| 2,914,259 | 11/1959 | Hestvik et al. | 241—73 X |
| 2,986,347 | 5/1961 | Stevenson | 241—73 X |
| 3,066,878 | 12/1962 | Wildbolz | 241—277 |

ROBERT C. RIORDON, Primary Examiner.

J. SPENCER OVERHOLSER, Examiner.